United States Patent
Huang et al.

(10) Patent No.: US 11,198,790 B2
(45) Date of Patent: Dec. 14, 2021

(54) WATER-RESISTIVE COATING COMPOSITION

(71) Applicant: DDP Specialty Electronic Materials US, LLC, Wilmington, DE (US)

(72) Inventors: Jessica Ye Huang, Lake Jackson, TX (US); Adam Grzesiak, Midland, MI (US); Jody Henning, Midland, MI (US); Heather Wiles, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 16/360,474

(22) Filed: Mar. 21, 2019

(65) Prior Publication Data
US 2020/0299540 A1 Sep. 24, 2020

(51) Int. Cl.

| | | |
|---|---|---|
| *C09D 175/04* | (2006.01) | |
| *C09D 7/61* | (2018.01) | |
| *C09D 7/63* | (2018.01) | |
| *C08K 3/26* | (2006.01) | |
| *C08G 18/24* | (2006.01) | |
| *C08G 18/32* | (2006.01) | |
| *C08G 18/48* | (2006.01) | |
| *C08G 18/76* | (2006.01) | |

(52) U.S. Cl.
CPC ............ *C09D 175/04* (2013.01); *C09D 7/61* (2018.01); *C09D 7/63* (2018.01); *C08G 18/246* (2013.01); *C08G 18/3206* (2013.01); *C08G 18/4833* (2013.01); *C08G 18/4854* (2013.01); *C08G 18/7621* (2013.01); *C08G 18/7664* (2013.01); *C08K 3/26* (2013.01); *C08K 2201/005* (2013.01)

(58) Field of Classification Search
CPC .................... C09D 175/04; C08K 3/26; C08K 2003/265; C08K 2003/267; C08G 18/3203; C08G 18/3206; C08G 18/76
See application file for complete search history.

(56) References Cited

U.S. PATENT DOCUMENTS

| | | | |
|---|---|---|---|
| 2012/0322328 A1* | 12/2012 | Yamada | ............. C08G 18/4202 442/76 |
| 2014/0275416 A1 | 9/2014 | Jenny | |
| 2015/0267076 A1 | 9/2015 | Bodkhe et al. | |

FOREIGN PATENT DOCUMENTS

WO 2013012699 A2 1/2013

\* cited by examiner

*Primary Examiner* — Vu A Nguyen

(57) ABSTRACT

A weather-resistive coating composition comprises from 21 to 25 weight percent of aromatic isocyanate with a functionality of at least 2.0, from 28 to 32 weight percent of polyol, from 4 to 8 weight percent of a diol having a molecular weight in the range of from 80 to 200, from 38 to 42 weight percent of filler having a particle size of no greater than 400 micrometers, and from 0.01 to 0.03 weight percent of a catalyst, wherein the coating composition has a water vapor permeability of at least 16 grains per $m^2$ per 1 hour per 3.4 kPa of mercury, and the coating composition is a component of a building wall or roofing structure.

13 Claims, 1 Drawing Sheet

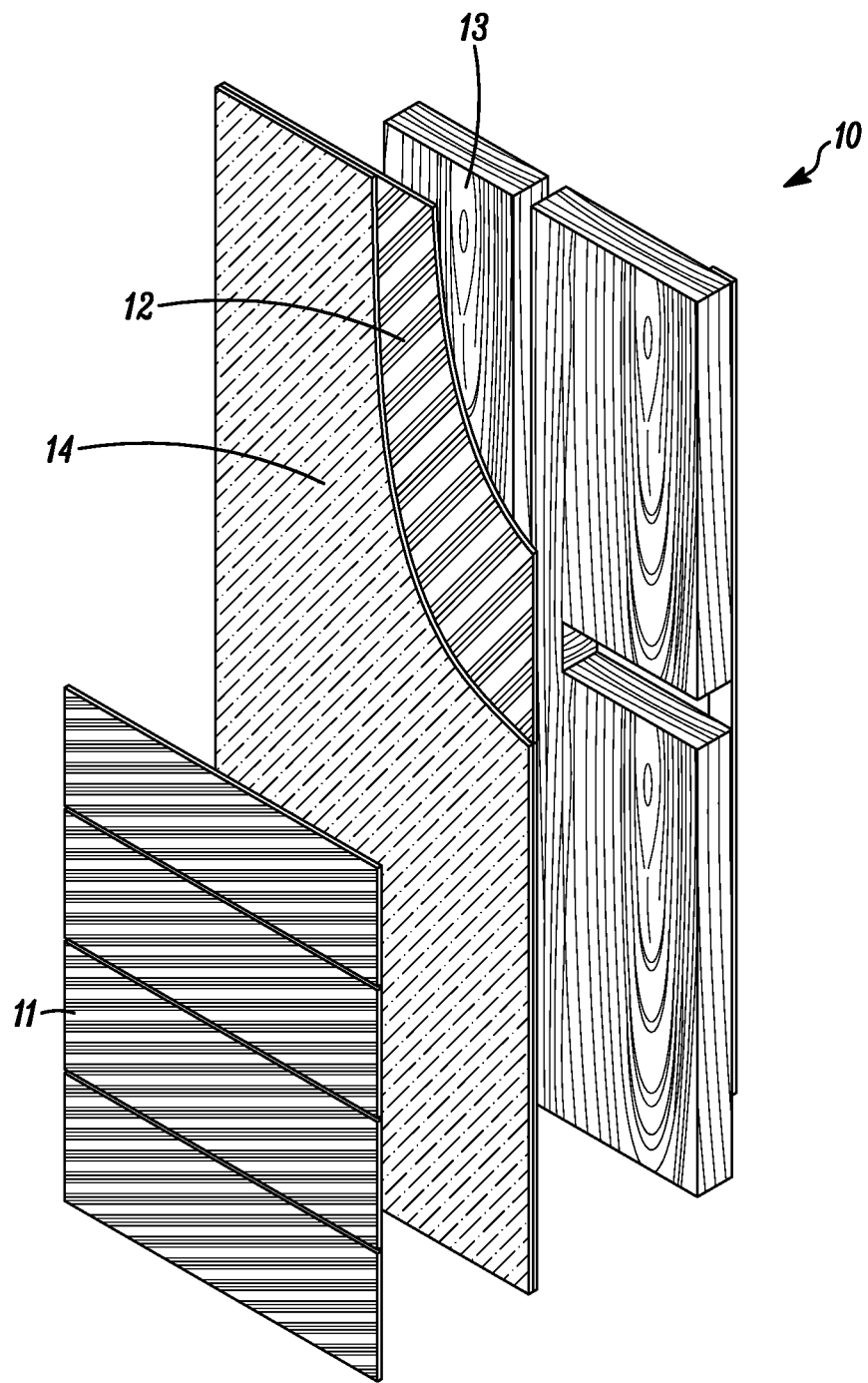

WATER-RESISTIVE COATING COMPOSITION

BACKGROUND

1. Field of the Invention

This invention is directed to a water-resistive composition suitable for use in the construction industry as a water-resistant membrane.

2. Description of Related Art

Water-resistant elastomeric coatings are applied to oriented strand board (OSB), plywood, concrete, cement or gypsum board surfaces of buildings. These coatings may be applied in-situ by a roller, brush or a spray or may be applied as the OSB or plywood board is being made.

Publication WO 2013/012699 A2 to Prajapati discloses a polyurethane based coating composition which comprises a base and an activator the base component comprising a polyol, a filler, a defoamer, a catalyst and a molecular sieve. The activator comprises polyisocyanate. Preferably the polyol comprises castor polyol, 2-methyl 1,3 dipropanediol or 1,4 butanediol and the filler comprises mica.

United States Patent Application publication 2014/0275416 to Jenny teaches polyurethane elastomers having solids contents greater than 40% by weight that are produced from a sprayable polyurethane-forming system composed of an isocyanate component and an isocyanate-reactive component. The isocyanate component has a solids content of from 40 to 80 wt. %, based on total weight of isocyanate component and is made up of at least one aromatic polyisocyanate having an NCO content of from 24 to 33%, a functionality of from 2 to 3 and at least one solid filler. The isocyanate-reactive component has a solids content of from 40 to 80 wt. %, based on total weight of the isocyanate-reactive component and is composed of at least one polyether polyol having a hydroxyl number of from 25 to 40 and a functionality of from 2 to 4, and at least one solid filler.

United States Patent Application publication 2015/0267076 to Bodkhe et al provides a coating composition comprising: (a) a one part moisture cure polyurethane comprising: an aromatic polyurethane prepolymer having backbone derived from polyether and at least one aromatic end group, wherein the coating composition comprises about 8 wt % to 90 wt % polyurethane prepolymer based on the total weight of the coating composition; (b) 2 to 60 wt % of an inorganic filler based on the total weight of the coating composition; and (c) 2 to 60 wt % of a solvent based on the total weight of the coating composition, wherein the coating composition, when cured, is a water-vapor semi-permeable, air and water barrier film.

There remains a need to provide low temperature and quick curing water-resistive compositions suitable for the construction industry that are available as two-part systems. It is desirable that such compositions have a liquid water resistance Cobb value of no greater than 10 as per ASTM D3285 and a water vapor permeability no lower than 15 grains per m² per 1 hour per 3.4 kPa.

SUMMARY OF THE INVENTION

This invention pertains to a weather-resistive coating composition comprising:
from 21 to 25 weight percent of aromatic isocyanate with a functionality of at least 2.0,
from 28 to 32 weight percent of polyol,
from 4 to 8 weight percent of a diol having a molecular weight in the range of from 80 to 200,
from 38 to 42 weight percent of filler having a particle size of no greater than 400 micrometers, and
from 0.01 to 0.03 weight percent of a catalyst,
wherein,
the coating composition has a water vapor permeability of at least 16 grains per m² per 1 hour per 3.4 kPa of mercury, and
the coating composition is a component of a building wall or roofing structure.

BRIEF DESCRIPTION OF THE DRAWINGS

FIG. 1 shows an exploded view of one embodiment of an exterior building wall assembly.

DETAILED DESCRIPTION

Coating Composition

In one embodiment, the weather-resistive coating composition comprises: from 21 to 25 weight percent of aromatic isocyanate with a functionality of at least 2.0,
from 28 to 32 weight percent of a polyol,
from 4 to 8 weight percent of a diol having a molecular weight in the range of from 80 to 200,
from 38 to 42 weight percent of filler having a particle size of no greater than 400 micrometers, and
from 0.01 to 0.03 weight percent of a catalyst wherein,
the coating composition has a water vapor permeability of at least 16 grains per m² per 1 hour per 3.4 kPa of mercury, and
the coating composition is a component of a building wall or roofing structure.

In another embodiment, the weather-resistive coating composition comprises: from 22 to 24 weight percent of aromatic isocyanate with a functionality of at least 2.0,
from 29 to 31 weight percent of a polyol,
from 5 to 7 weight percent of a diol having a molecular weight in the range of from 80 to 200,
from 39 to 41 weight percent of filler having a particle size of no greater than 400 micrometers, and
from 0.015 to 0.028 weight percent of a catalyst wherein,
the coating composition has a water vapor permeability of at least 16 grains per m² per 1 hour per 3.4 kPa of mercury, and
the coating composition is a component of a building wall or roofing structure.

In yet another embodiment, the weather-resistive coating composition comprises: 23 weight percent of aromatic isocyanate with a functionality of at least 2.0,
30.1 weight percent of a polyol,
6.8 weight percent of a diol having a molecular weight in the range of from 80 to 200,
40 weight percent of filler having a particle size of no greater than 400 micrometers, and
0.02 weight percent of a catalyst wherein,
the coating composition has a water vapor permeability of at least 16 grains per m² per 1 hour per 3.4 kPa of mercury, and
the coating composition is a component of a building wall or roofing structure.

Preferably, the filler has a particle size of no greater than 400 micrometers. In some embodiments, the filler has a particle size of from 74 to 400 micrometers while in some other embodiments the filler has a particle size of from 80 to 400 micrometers or even 85 to 400 micrometers. Preferably, the filler is calcium carbonate or calcium magnesium carbonate. When the filler content is too high, the nail sealability of the coating when tested to ASTM D7349/D7349M Protocol 1 can fail. When the filler content is too low, the desired water vapor permeability performance may be compromised.

The aromatic isocyanate may be methylenediphenyl diisocyanante (MDI), toluene diisocyanate (TDI) or polymeric diphenylmethane diisocyanate (PMDI), preferably polymeric diphenylmethane diisocyanate.

The diol has a molecular weight in the range of from 80 to 200, one suitable example of this being butanediol.

The polyol may be polyether polyol, polybutadiene polyol, propyleneoxide end capped polyol or ethyleneoxide end capped polyol.

A preferred catalyst is dibutyltin dilaurate. Other suitable catalysts are 2,2 dimorpholinodiethylether, N-methylmorpholine, N-ethylmorpholine, N-butylmorpholine, 2-(2-(dimethylamino)ethoxy)ethan-1-ol, N-(2-(dimethylamino)ethyl)-n-methylethanolamine, bis(2-dimethyl aminoethylether), $N^1$-(2-(dimethylamino)ethyl)-$N^2$, $N^2$-dimethylyetane-1,2-diamine, N,N,N',N',N''-pentamethyldiethylenetriamine, N,N,N',N'-tetramethylethylenediamine, 1,3-bis(dimethylamino)propane, N,N-dimethylaminopropylamine, N,N-diethylethanolamine, dimethylethanolamine, N1-(3-(dimethylamino)propyl)-$N^1$,$N^3$,$N^3$-trimethylpropane-1,3-diamine, N,N-diisopropylethanolamine or ethanolamine.

When the coating is to be applied in-situ on a building, it is preferable that the coating is supplied as a two-part kit suitable for mixing and use on site. In such a circumstance, Part A of the kit comprises the aromatic isocyanate and Part B of the kit comprises polyether polyol, butanediol, filler and catalyst. When the coating is applied to an OSB or plywood board as it is being made, the coating may be used as a one-component system as an alternative to a two-part kit.

Preferably the composition has a cure time of less than 24 hours when cured at ambient temperature.

Use of the Coating Composition

The coating composition is particularly effective as a weather-resistive coating in a building wall or roofing structure.

FIG. 1 shows generally at 10 an exploded view of one embodiment of an exterior building wall assembly. Components of the assembly include exterior cladding 11, an oriented strand board or plywood board 12 and insulation 13. Further components such as a stud frame and gypsum sheets are positioned on the innermost side of the insulation 13. A water-resistive coating 14 such as described herein is applied on the outer facing side of board 12.

The coating composition 14 has a water vapor permeability of at least 16 grains per $m^2$ per 1 hour per 3.4 kPa of mercury (23 grains per $ft^2$ per 1 hour per inch of mercury) and a liquid water resistance Cobb value of no greater than 10.

TEST METHODS

Particle Size Measurement of Fillers

The particle size of each filler was measured using a Beckman Coulter LS 13 320 Laser Diffraction Particle Size Analyzer. The method for particle size distribution (PSD) follows that described in Beckman Coulter LS 13 320 operational manual part number B05577AB published October 2011.

Water Vapor Permeability (WVP) Measurement

Coating films of the composition were prepared on release liner (Technicote: 53# SCK LINER L-3) by drawdown method. Coatings having a 0.3 mm (12 mil) nominal thickness were obtained using a 0.5 mm (20 mil) gap drawdown bar. The films were cured overnight in an ambient environment.

WVP of the freestanding films was tested using a MOCON 100.4K test machine at 38° C. and 100%RH according to ASTM D6701-01. For each sample, two specimens were cut from the films and used to obtain an average WVP value.

Water Absorption Measurements (Cobb Test)

The Cobb Tests according to ASTM 5795-16 were conducted using FLAMEBLOCK® (Louisiana Pacific) as the substrate and the coating formulations were coated on the FLAMEBLOCK® using the drawdown method described above. The substrates were conditioned at 60° C. overnight prior to coating.

EXAMPLES

Examples prepared according to current invention are indicated by numerical values. Control or Comparative Examples are indicated by letters.

Materials

The aromatic isocyanate with a functionality of at least 2.0 was polymeric MDI available from Dow Chemical, Midland, MI under the tradename PAPI 27.

The polyol was polyether polyol also from Dow under the tradename Voranol 4240.

The butanediol was from Millipore Sigma.

Calcium carbonate filler grades were from Imerys Carbonates, Cockeysville, Md.

MMT nanoclay filler was montmorillonite treated nanoclay, surface modified filler (lot MKBL3496V) from Millipore Sigma, St. Louis, Mo.

Graphite (<20 micron, synthetic) filler was also from Millipore Sigma.

Sepiolite clay was from Southern Clay Products, Gonzales, Tex.

Bentonite clay and Tixogel VZ and VP thixotropes were obtained from BYK USA Inc, Wallingford, Conn.

Thixotropic silica, talc and 1/16 milled glass fiber were sourced from FibreGlast, Brookville, Ohio.

The catalyst was dibutyltin dilaurate from Millipore Sigma.

Preparation

Voranol 4240 polyol, dibutyltin dilaurate catalyst and butanediol were mixed by a dual-axis speed mixer (Flacktek DAC-150). Filler was then added also using the speed mixer. This constituted part B. Prior to application as a WRB coating, the Part B component was mixed with Part A (PAPI™ 27) by speed mixer at 2000 rpm for 30 s. The formulations are shown below in Table 1.

All the formulations in Table 1 had a 50% hard segment. The percent hard segment is the mass fraction of low molecular weight species (here no greater than 500 g/mol) in the polyurethane backbone. In this case, the hard segment comprised the mass fraction of isocyanate plus the mass fraction of butanediol chain extender. Conversely the soft segment is the mass fraction of higher Mw species, which is typically only the polyol.

TABLE 1

| Example | Polyol % | Diol % | Filler % | Filler Type | Catalyst % | MDI % |
|---|---|---|---|---|---|---|
| A | 10.00 | 2.26 | None | — | 0.02 | 7.74 |
| 1 | 4.00 | 0.90 | 60 | CaCO$_3$ (74-400μ) | 0.02 | 3.10 |
| 2 | 6.04 | 1.36 | 40 | CaCO$_3$ (74-400μ) | 0.02 | 4.60 |
| 3 | 6.04 | 1.36 | 40 | CaCO$_3$ (297-595μ) | 0.02 | 4.60 |
| 4 | 4.00 | 0.90 | 60 | CaCO$_3$ (40-45μ) | 0.02 | 3.10 |
| B | 9.00 | 2.03 | 60 | CaCO$_3$ (40-400μ) | 0.02 | 6.97 |
| 5 | 9.00 | 2.03 | 10 | MMT Nano Clay | 0.01 | 6.97 |
| 6 | 9.00 | 2.03 | 10 | Graphite | 0.01 | 6.97 |
| C | 9.00 | 2.03 | 10 | Sepiolite | 0.01 | 6.97 |
| D | 9.00 | 2.03 | 10 | Bentonite | 0.01 | 6.97 |
| E | 9.00 | 2.03 | 10 | 1/16 Milled Glass Fiber | 0.01 | 6.97 |
| F | 9.00 | 2.03 | 10 | Thixotropic Silica | 0.01 | 6.97 |
| G | 9.00 | 2.03 | 10 | Talc | 0.01 | 6.97 |
| H | 9.00 | 2.03 | 10 | Tixogel ™ VZ | 0.01 | 6.97 |
| I | 9.00 | 2.03 | 10 | Tixogel ™ VP | 0.01 | 6.97 |

Table 2 provides some further information on the particle size of the fillers used in the examples.

TABLE 2

| Example | Filler Type | Filler d10 (microns) | Filler D50 (microns) | Filler D90 (microns) |
|---|---|---|---|---|
| A | — | — | — | — |
| 1 | GM 40-200 CaCO$_3$ (74-400μ) | 105 | 229 | 385 |
| 2 | GM 40-200 CaCO$_3$ (74-400μ) | 105 | 229 | 385 |
| 3 | CaCO$_3$ (297-595μ) | 105 | 229 | 385 |
| 4 | CaCO$_3$ (40-45μ) | 3.18 | 54.1 | 155 |
| B | CaCO$_3$ (40-400μ) | 1.78 | 39.8 | 122 |
| 5 | MMT Nano Clay | 1.37 | 8.90 | 24.8 |
| 6 | Graphite | 1.88 | 7.09 | 17.2 |
| C | Sepiolite | 2.86 | 28.1 | 148 |
| D | Bentonite | 2.35 | 19.4 | 52.0 |
| E | 1/16 Milled Glass Fiber | 17.8 | 54.2 | 231 |
| F | Thixotropic Silica | 1.38 | 4.25 | 9.24 |
| G | Talc | 2.71 | 13.2 | 32.4 |
| H | Tixogel ™ VZ | 12.01 | 44.9 | 96.8 |
| I | Tixogel ™ VP | 8.95 | 33.6 | 77.9 |

The compositions were then coated onto a liner for water vapor permeability and water absorption tests. The visual quality of the coating was also noted. Those coatings of poor visual quality or having a liquid water resistance Cobb value of greater than 10 as per ASTM D3285 or a water vapor permeability lower than 23 grains per ft$^2$ per 1 hour per inch Hg (15 grains per m$^2$ per 1 hour per 3.4 kPa) were deemed to be unacceptable and referenced as comparative examples. The test results are shown in Table 3.

TABLE 3

| Example | Film Quality | WVP (grains per ft2 per 1 h per inch of Hg (US Perms)) | Average Cobb Units* (ASTM 5795) |
|---|---|---|---|
| A | Good | 22.77 | 7.2 |
| 1 | Good | 60.77 | 5.3 |
| 2 | Good | 47.31 | 6.0 |
| 3 | Good | Not measured | 5.9 |
| 4 | Good | 27.65 | 4.5 |
| B | Good | 16.32 | 4.4 |
| 5 | Good | 26.64 | 4.8 |
| 6 | Good | 32.76 | 5.7 |
| C | Poor | Unable to measure - saturated instrument implying permeability is excessive | 6.3 |
| D | Foamy | 45.89 | 7.3 |
| E | Poor | 43.90 | 6.1 |
| F | Poor | 37.68 | 5.8 |
| G | Poor | 35.58 | 6.1 |
| H | Poor | 40.37 | 5.7 |
| I | Poor | 37.68 | 5.2 |

*The standard error based on a pool variance of the triplicate water absorption tests is ±0.4 units.

What is claimed is:

1. A weather-resistive coating composition, suitable for use as a component of a building wall or roofing structure, comprising:
   from 21 to 25 weight percent of aromatic isocyanate with a functionality of at least 2.0,
   from 28 to 32 weight percent of polyol,
   from 4 to 8 weight percent of a diol having a molecular weight in the range of from 80 to 200,
   from 38 to 42 weight percent of filler having a particle size of no greater than 400 micrometers, and
   from 0.01 to 0.03 weight percent of a catalyst,
   wherein,
   the coating composition has a water vapor permeability of at least 16 grains per m$^2$ per 1 hour per 3.4 kPa of mercury.

2. The composition of claim 1 wherein the aromatic isocyanate is methylenediphenyl diisocyanante, toluene diisocyanate or polymeric diphenylmethane diisocyanate.

3. The composition of claim 1 wherein the polyol is polyether polyol, polybutadiene polyol, propyleneoxide end capped polyol or ethyleneoxide end capped polyol.

4. The composition of claim 1 wherein the diol is butanediol.

5. The composition of claim 1 wherein the filler is calcium carbonate or calcium magnesium carbonate both having a particle size of from 74 to 400 micrometers.

6. The composition of claim 1 wherein the catalyst is dibutyltin dilaurate.

7. The composition of claim 1 wherein the composition comprises from 22 to 24 weight percent of aromatic isocyanate.

8. The composition of claim 1 wherein the composition comprises from 29 to 31 weight percent of polyol.

9. The composition of claim 1 wherein the composition comprises from 5 to 7 weight percent of a diol having a molecular weight in the range of from 80 to 200.

10. The composition of claim 1 wherein the composition comprises from 39 to 41 weight percent of filler.

11. The composition of claim 1 wherein the composition comprises from 0.015 to 0.025 weight percent of catalyst.

12. The composition of claim 5 wherein the calcium carbonate or calcium magnesium carbonate has a particle size of from 80 to 400 micrometers.

13. A building wall or roofing structure comprising a component having the weather-resistive coating composition of claim 1.

\* \* \* \* \*